US007847189B2

(12) United States Patent
Findeisen

(10) Patent No.: US 7,847,189 B2
(45) Date of Patent: Dec. 7, 2010

(54) ELECTRICAL COMPONENT

(75) Inventor: Jörg Findeisen, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 372 days.

(21) Appl. No.: 11/994,454

(22) PCT Filed: Jun. 30, 2006

(86) PCT No.: PCT/EP2006/063735

§ 371 (c)(1), (2), (4) Date: Feb. 12, 2008

(87) PCT Pub. No.: WO2007/003595

PCT Pub. Date: Jan. 11, 2007

(65) Prior Publication Data

US 2008/0196925 A1 Aug. 21, 2008

(30) Foreign Application Priority Data

Jul. 1, 2005 (DE) ....................... 10 2005 032 016
Jul. 1, 2005 (DE) ....................... 10 2005 032 017

(51) Int. Cl.
*H02G 3/08* (2006.01)

(52) U.S. Cl. ........................... 174/50; 174/5 R; 174/18; 174/17 CT; 336/90

(58) Field of Classification Search ................. 174/5 R, 174/50, 17 CT, 18; 439/292; 220/4.02; 312/326; 336/90
See application file for complete search history.

(56) References Cited

U.S. PATENT DOCUMENTS 6,804,092 B1 10/2004 Magnier
6,867,364 B2 * 3/2005 Hafskjold et al. ............. 174/50

FOREIGN PATENT DOCUMENTS

| | | | |
|---|---|---|---|
| AT | 198363 | B | 6/1958 |
| DE | 608496 | C | 1/1935 |
| DE | 904919 | C | 2/1954 |
| DE | 1909810 | U | 2/1965 |
| DE | 1921611 | U | 8/1965 |
| DE | 20209213 | U1 | 10/2003 |
| DE | 60002698 | T2 | 4/2004 |

* cited by examiner

*Primary Examiner*—Dhiru R Patel
(74) *Attorney, Agent, or Firm*—Laurence A. Greenberg; Werner H. Stemer; Ralph E. Locher

(57) ABSTRACT

An electric component, in particular an electric switch placed in a liquid-filled housing of an electrical installation, in particular a transformer, is filled with an insulating and cooling medium. The use of a compensating element, for example in the form of a bellow, makes it possible to transmit volume variations produced in the electric component directly to the surrounding liquid contained in the housing.

18 Claims, 5 Drawing Sheets

ELECTRICAL COMPONENT

BACKGROUND OF THE INVENTION

Field of the Invention

The invention relates to an electrical component, particularly an electrical switch, in a housing, filled with a liquid, for an electrical installation, particularly a transformer, the electrical component being arranged in the housing and the electrical component being filled with an insulating and cooling medium. The invention also relates to the arrangement of the electrical component in an electrical installation, and also to the use thereof in an electrical installation.

It is known practice to use a common expansion tank for a transformer and a switch, but this results in the insulating liquids being mixed. For this reason, a two-chamber expansion tank is predominantly used at present.

Such expansion tanks are described by way of example in DE 19527763C2. A drawback of these expansion tanks is the contact between the oil surface and the outside air, which requires the use of what are known as dehumidifiers. These dehumidifiers pass the air over a desiccant and in so doing dehumidify it. This depletes the adsorption capability of the desiccant (hygroscopicity), and the desiccant needs to be regularly replaced. The periodically required visual checks and the regular replacement of the desiccant, particularly in areas of high humidity, represent a considerable cost factor (recommended maintenance intervals: every 3 months).

In addition, these dehumidifiers do not provide safe sealing from the absorption of moisture and oxygen by the insulating liquid, particularly when the transformer cools quickly.

DE10010737A1 describes a hermetically sealed transformer which provides an expansible radiator for volume control. The use of such a radiator to compensate for the volume expansion of the switch's insulating liquid requires considerable complexity and entails problems when discharging gases from the switch tank.

It is also known practice to use a nitrogen cushion to absorb the change in volume of the insulating oil. However, this requires a relatively large volume and results in an excess pressure upon heating. The pressure within the switch tank can differ significantly from the pressure of the insulating liquid surrounding the switch.

In addition, expansion tanks for transformers are known which use a diaphragm in the main chamber in order to isolate the insulating liquid from the ambient air. One of these is described in DE 3206368. Although these expansion tanks provide safe sealing of the insulating liquid from the ambient air, they nevertheless require a dehumidifier, which has the associated drawbacks already mentioned. In addition, the contact with the ambient air causes the diaphragm to age and therefore gives rise to technical uncertainties.

DE10224074A1 describes an arrangement for the conduit routed into the electrical step component, which arrangement uses a labyrinth system to prevent gases from flowing to the expansion tank. However, this system neither provides hermetic sealing for the electrical component nor allows the penetration of gases into the conduit to be prevented completely. The complex conduit arrangement for the oil expansion tank also continues to be necessary.

BRIEF SUMMARY OF THE INVENTION

It is an object of the present invention to avoid the aforementioned drawbacks and to simply, rapidly and safely prevent excess pressure in a transformer's switch.

The object is achieved by the features of claim 1. Accordingly, provision is made for at least one compensation element arranged in the housing to be connected to the electrical component and to compensate for volume changes in the insulating and cooling medium within the electrical component. The arrangement of the compensation element in the liquid-filled housing of the electrical installation transfers the excess pressure in the electrical component to the much larger volume of the electrical installation. Pressure fluctuations occurring inside the housing with this arrangement can be compensated for using compensating apparatuses.

This allows simple means to be used for pressure compensation between the internal pressure of the electrical component and the electrical installation's liquid-filled housing which surrounds the electrical component. The invention allows the electrical component to be hermetically sealed and therefore permits a significant reduction in the ageing of the insulating and cooling medium used in the electrical component. The use of the inventive arrangement also allows dehumidifiers and associated conduits to be dispensed with. In addition, the invention solves the problem of gas buildup in the conduit to the expansion tank in hermetically sealed electrical installations.

The volume of the insulating and cooling medium, e.g. oil, for the electrical component is very small in relation to the electrical installation's liquid volume. The invention makes use of this circumstance by not performing the volume control using external expansion tanks, but rather transferring the insulating and cooling medium's volume change directly to the electrical installation's liquid volume using suitable compensation elements. The compensation is therefore then undertaken by the compensating apparatuses provided for the electrical installation's volume control.

The use of further compensating apparatuses for the insulant and/or coolant, such as oil expansion tank, expansion radiators, compensators or gas cushions, is necessary only in special cases, since the volume required for the electrical component is almost always significantly less than 1% of the volume of the electrical installation.

Another advantage is that the housing is hermetically sealed and at least one compensating apparatus connected to the housing is used to absorb an excess pressure in the housing. In addition, the compensation element is integrated in the electrical component.

Preferably, the compensation element is connected to the electrical component via a conduit. The opening in the conduit is positioned in the lower region of the electrical component in order to prevent any gases present from entering the conduit.

A passage valve and/or a shutoff valve and/or a drain valve is integrated in the electrical component, and these open or close when set pressures are exceeded or undershot.

Preferably, the compensation element at least partly comprises electrically conductive material and is therefore used as a shield. In addition, the compensation element is in the form of an elastic diaphragm. Furthermore, the compensation element comprises metal compensators and/or bellows.

In one advantageous refinement, the compensation element is provided with a spring element in order to produce a predetermined pressure difference between the housing and the electrical component. The compensation element is protected from pressure waves by at least one pressure wave attenuator.

The pressure wave attenuator is arranged in the supply line to the compensation element by means of a reduction in cross section.

The housing wall of the electrical component is preferably used partly or completely as a compensation element.

The electrical component is an electrical switch and the electrical installation is a transformer.

Preferably, the inventive arrangement is in a form such that the electrical component is equipped with at least one apparatus for collecting and draining gases which are produced.

The electrical installation is equipped with apparatuses for detecting the filling level of the liquid and/or of the insulating and cooling medium and/or for detecting pressures.

Advantageously, the electrical component is equipped with a supplementary body for holding a small quantity of an additional insulating and cooling medium in order to replace the loss of insulating and cooling medium which arises in the event of decomposition as a result of switching processes and/or heating of the transition resistors.

The deformations caused on the compensation element by the volume alteration are used for evaluating and/or indicating the insulating and cooling medium which is present.

The inventively arranged compensation element may be in the form of either a metal compensator, a bubble memory, a foil bag, a plastic diaphragm or a rubber compensator.

In one advantageous embodiment of the invention, the problem of gas buildups in the conduit to the expansion tank is solved by virtue of the conduit for transporting away the gases being isolated from the connecting line between the electrical component and the compensation element. This prevents operating faults as a result of gas cushions in the connection to the expansion tank in the case of hermetically sealed electrical installations. In addition, this design allows the provision of a special gas collection space which prevents the pressure relief valve from responding too frequently and the additional loss of oil which is often associated with this.

In another embodiment, the upper region of the electrical component is provided with an additional volume for holding a particular quantity of additional insulating and cooling medium in order to replace the loss of insulating and cooling medium which arises in the event of decomposition as a result of switching processes and/or heating of the transition resistors.

The gases produced upon decomposition of the insulating and cooling medium rise and collect in this additional space. The much greater gas volume means that an excess pressure is produced in the electrical component. If the pressure in the electrical component exceeds a predetermined limit value, the pressure relief valve, which is closed during normal operation, opens and provides pressure relief with the atmosphere surrounding the electrical component. The inventive design of the compensation elements allows the electrical component's insulating and cooling medium to be sealed completely from the atmosphere/ambient air without restricting the oil expansion. In this case, the insulating and cooling medium in the electrical component may be in liquid or gaseous form.

The absorption of moisture and oxygen by the insulating and cooling medium is prevented. Any influence on the electric strength of the insulating and cooling medium by moisture is prevented, and ageing is significantly reduced.

The outer expansion tank, the dehumidifier and the associated conduits can be dispensed with. It is possible to save the regular check on the state of the desiccant in the dehumidifier, and cost savings are obtained as a result of dispensing with the costly regular replacement of the desiccant. Environmental pollution and disposal problems as a result of used desiccant are avoided.

The compensation elements do not come into contact with the outside atmosphere, which means that the corrosion of metal compensators under moisture and the ageing of plastic diaphragms in the compensation elements under the action of moisture, oxygen and ozone are prevented. This significantly reduces the demands on the compensation elements used.

Advantageously, the inventive electrical component is equipped with a gas drain valve. This may expediently be configured or controlled such that it responds at a low gas pressure but not when an insulating and cooling medium is present. This allows the gases to be continually pumped away. Protection against excess pressure is provided by means of a pressure valve and/or an ordinary large-area pressure relief valve.

In another particular embodiment, the compensation element is provided with a spring element in order to achieve a predetermined pressure difference between the two insulating liquids.

The speed of the necessary volume control in the event of heating is dependent on the time constants of the electrical installation and the electrical component and also on the operating conditions, but is quite slow in any case. To keep surging volume changes (large volumes of gas arising as a result of decomposition of the insulating and cooling medium) away from the compensation element in the event of a fault, it is advantageous to provide pressure dampers in the conduit to the compensation element.

At the same time, it is necessary to provide for the gases to be routed to a pressure relief valve or another pressure reduction apparatus in such a way as to cause little obstruction and delay to the removal of gas.

In one specific embodiment, the compensation element is equipped with volume limiting in one or else both directions. This means that, by way of example, there may be less pressure movement in the electrical component than in the main vessel of the electrical installation. This limiting is likewise possible by limiting the travel of the compensating elements and by means of a multi-component compensation element with chambers having different elastic constants.

BRIEF DESCRIPTION OF THE SEVERAL VIEWS OF THE DRAWING

Further advantageous refinements are described in the subclaims. The invention is explained by way of example below with reference to the drawings, in which:

DESCRIPTION OF THE INVENTION

Figure 1:
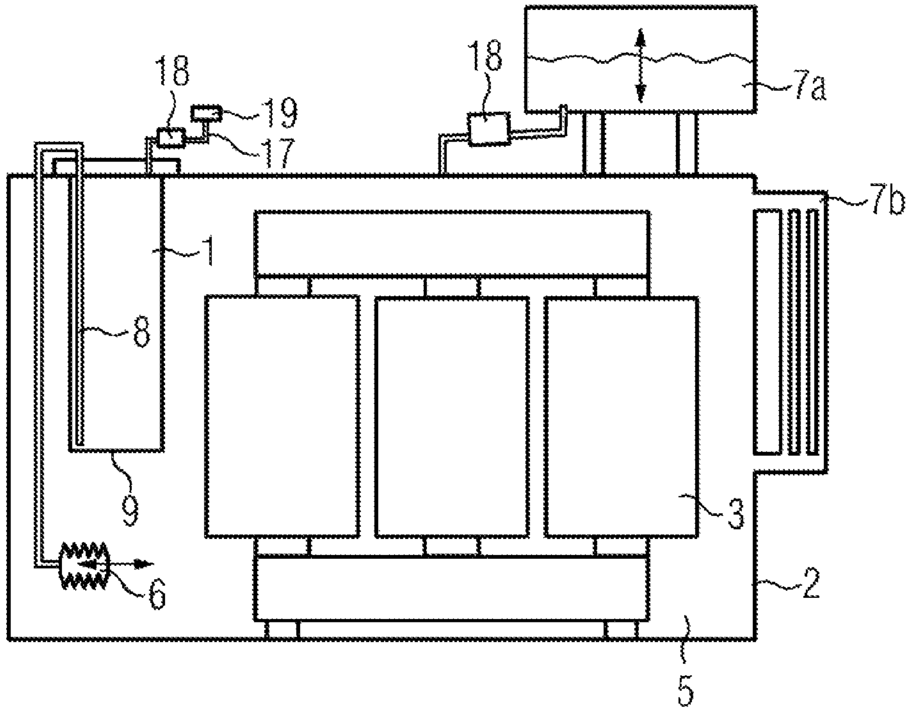
FIG. 1 shows a schematic side view of the electrical installation with an inventive electrical component inside the housing.

The figure FIG. 1 shows an electrical component 1 which is arranged in a housing 2 of the electrical installation 3. The housing 2 contains an active part of the electrical installation 3 as a transformer with at least one winding. The space inside the housing 2 is filled with a liquid 5.

In line with the invention, the volume control for the insulating and cooling medium 3 is performed using a compensation element 6, which is connected to the interior of the electrical component 1 via a conduit 8. When the insulating and cooling medium 4 in the electrical component 1 heats up, thermal expansion takes place and hence the volume is increased. Since the housing wall 9 of the electrical component 1 hermetically seals it, the insulating and cooling medium flows via the conduit 8 to the compensation element 6. Expansion of this compensation element 6 results in pressure compensation between the insulating and cooling medium 4 in the electrical component 1 and the liquid 5 of the electrical installation 3. The change in volume of the insulating and cooling medium 4 in the electrical component 1 is passed on to the liquid 5 in the housing 2. In the housing 2 of the electrical installation 3, the change in volume is passed on to the expansion tank 7*a* which is present or to other volume control apparatuses 7*b* for the liquid 5, e.g. expansion radiators. Expansion tanks are, in particular, an oil expansion tank, expansion radiators, compensators or bodies with a gas cushion.

To prevent buildups of gas in the conduit to the expansion tank 7*a*, the channel for transporting away the gases is isolated from the connecting line between the electrical component and the compensation element 6. The connection to the electrical component 1 is made by means of a conduit 8, which is routed into the electrical component 1 at least deeply enough for gases to be prevented from entering this conduit 8.

Gases which are produced rise and are routed via a further conduit 12 to a monitoring device. If the volume of gas is too great, gas is drained via a valve 19.

In the exemplary embodiment shown, the compensation element 6 is accommodated using unused spaces inside the housing 2, for example below the electrical component 1.

Figure 2:
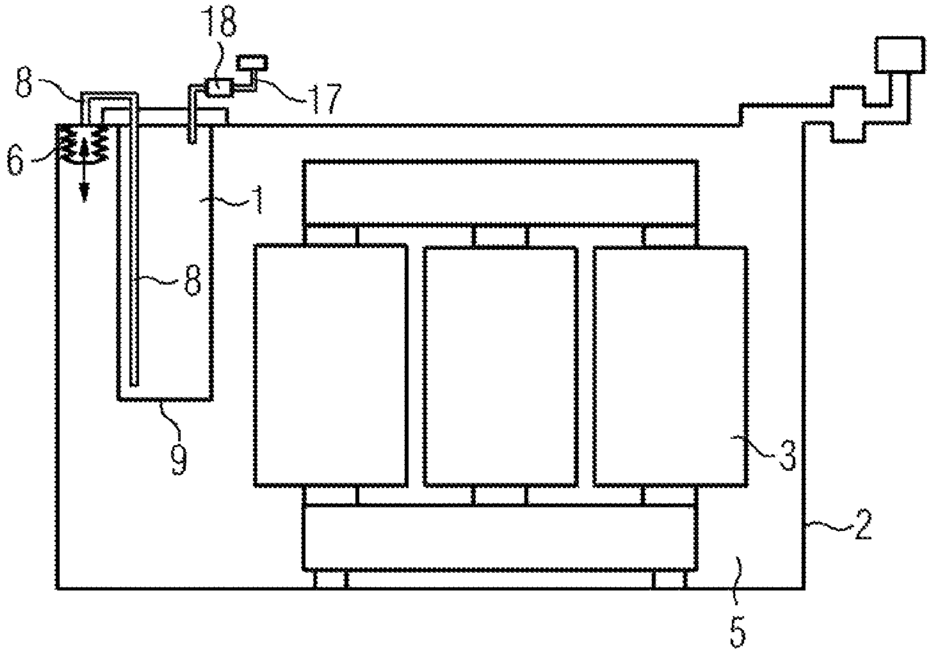
FIG. 2 shows a schematic side view of the electrical installation with an inventive electrical component on the housing cover.

The figure FIG. 2 shows the direct arrangement of the compensation element 6 on the top cover of the housing 2.

This embodiment requires only short conduits 8 for connection to the compensation element 6. In this arrangement, optimum use of the spaces obtained from the usually angular shape of the housing 2 and round windings of the electrical installation 3 and the shape of the electrical component 1 is possible for the arrangement of the compensation element 6 within the housing 2.

Figure 3:
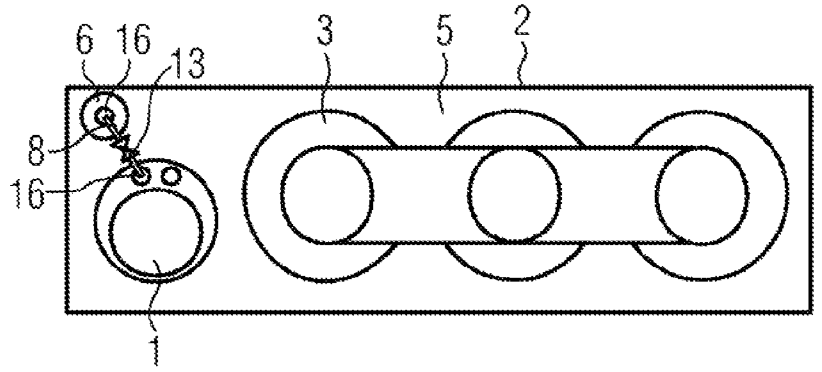
FIG. 3 shows a schematic plan view of the electrical installation with an electrical component arranged on the housing cover.
Figure 4:
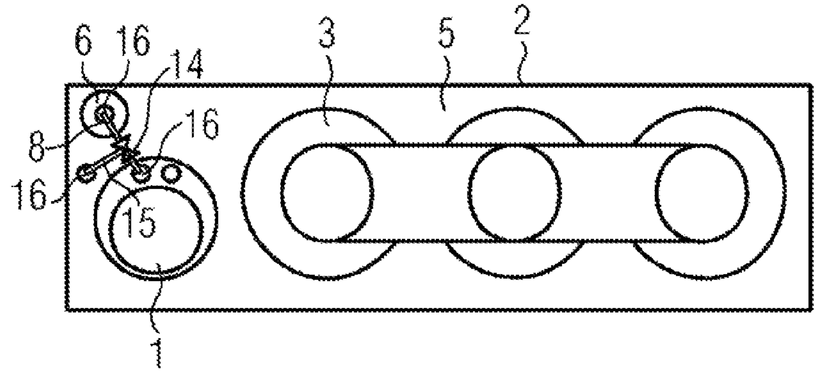
FIG. 4 shows a schematic plan view of the electrical installation with an electrical component arranged on the housing cover.

The figure FIG. 3 shows a plan view of the electrical installation 3 with provision of the compensation element 6 below the cover of the housing 2 of the electrical installation 3. In this case, optimum use is made of the space inside the housing 2, utilizing the space obtained as a result of round windings of the transformer as electrical installation 3 and of the electrical component 1. The figure FIG. 4 shows a similar arrangement to that in FIG. 3, in which a slide valve 13 in the line between the electrical component 1 and the compensation element 6 has been replaced by a three-way tap 14 on which an additional conduit 15 for setting up a direct connection to the housing 2 is provided. This allows direct pressure compensation to be produced, for example when the housing 2 is filled or evacuated. This would provide the same options as when using a traditional two-chamber expansion tank.

Figure 5:
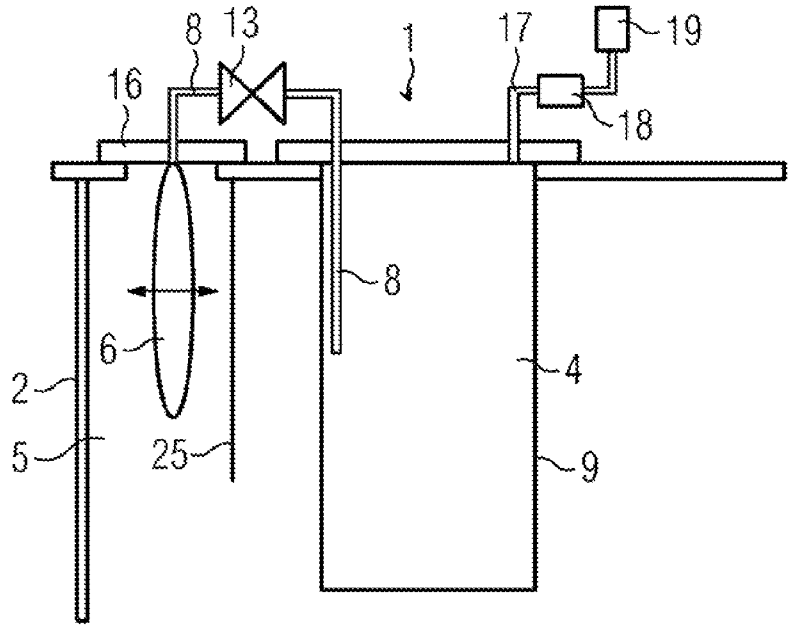
FIG. 5 shows a schematic side view of the electrical installation with an inventive electrical component and a flange on the housing cover.

The embodiment of the invention which is shown in the figure FIG. 5 shows the compensation element 6 with a flange 16 which is larger than the compensation element 6 and is provided directly below the cover of the housing 2. This arrangement allows uncomplicated inspection and replacement of the compensation element 6 when needed. The compensation element 6 and the electrical component 1 have an intermediate wall 25 arranged between them.

The invention also includes an electrical component 1 where a compensation element 6 is mounted directly on the electrical component 1. In this case too, the volume control is performed by transferring the change in volume of the insulating and cooling medium 4 in the electrical component 1 to the housing 2 by means of compensation elements 6. This inventive arrangement makes the compensation element 6 part of the electrical component 1. Additional external assemblies are dispensed with and result in the entire electrical installation 3 being simplified.

This embodiment will be explained in more detail with reference to the subsequent figures.

Figure 6A:
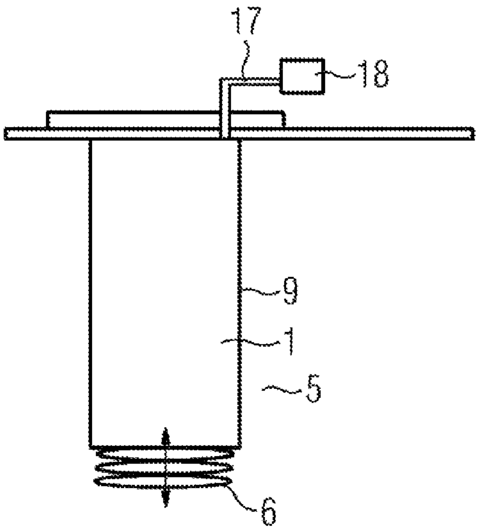
FIGS. 6*a*, . . . , 6*d* show schematic side views of the electrical component with different compensation elements.
Figure 6B:
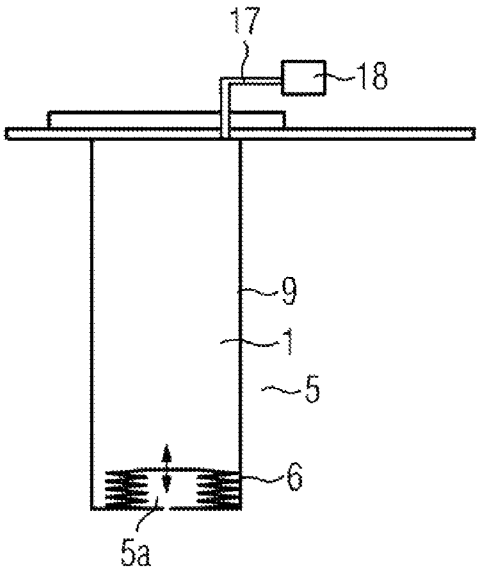

FIG. 6*a* shows an electrical component 1 of the inventive design with a compensation element 6 which is provided directly on the switch as electrical component 1. This compensation element 6 results in direct compensation for the internal pressure in the electrical component 1 with the pressure inside the housing 2 of the electrical installation 3. Gases which are produced rise and are routed to a monitoring device 18 via the conduit 17.

Figure 6C:
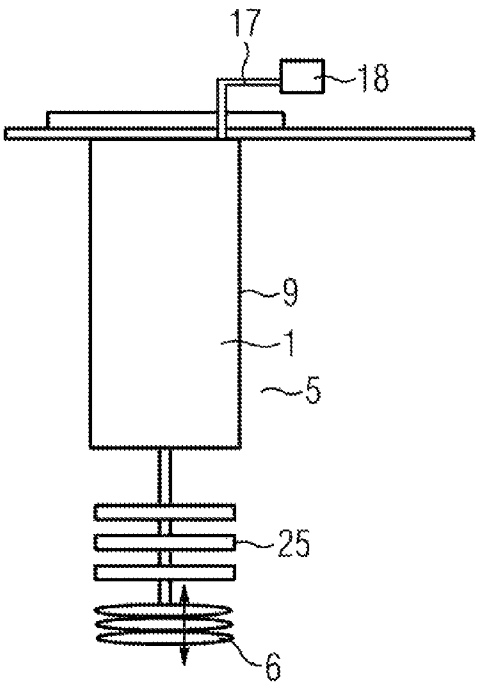
Figure 6D:
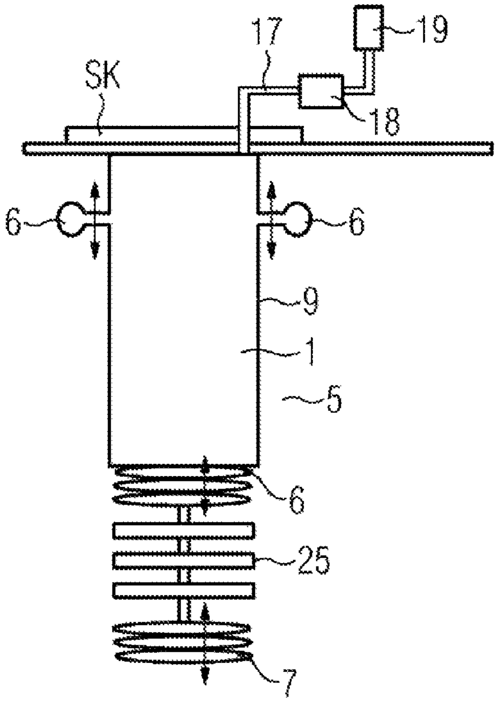

FIGS. 6*c* and 6*d* show arrangements and embodiments of the compensation elements 6 which allow them to be used as shielding electrodes. This is suited to metal compensators on account of their relatively large radii and the diameter which is required for compensation.

Figure 7A:
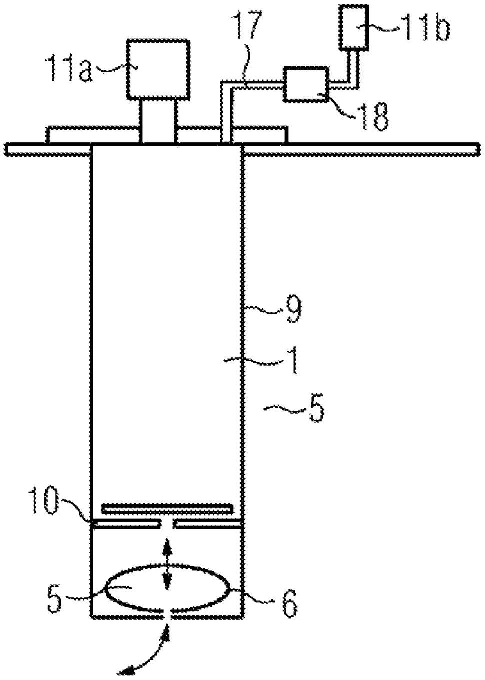
FIGS. 7*a*, . . . , 7*d* show schematic side views of the electrical component with different compensation elements with negative compensation.
Figure 7B:
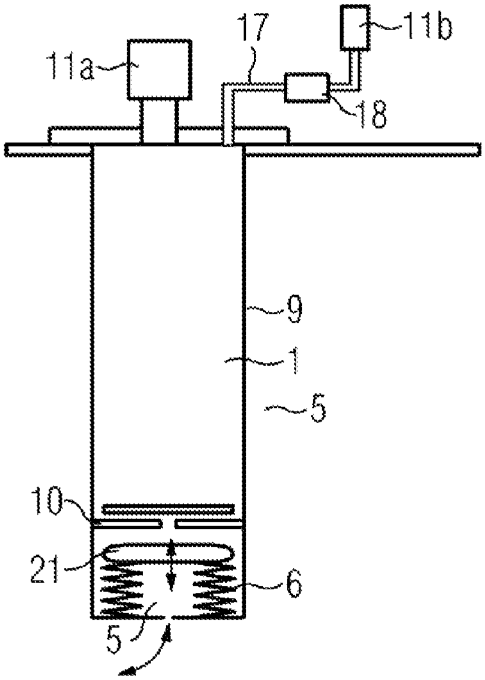

FIG. 7*a* shows an embodiment which uses a negative compensation element 6. In this embodiment, the compensation element 6 is not expanded upon heating, but rather the increase in the volume of the insulating and cooling medium 4 in the electrical component 1 is achieved by compressing the compensation element 6 and forcing out liquid 5 into the housing 2.

In this variant, the compensation element 6 can easily be mechanically protected by the housing wall 9 of the electrical component 1 or by cylindrical supporting bodies.

Figure 7C:
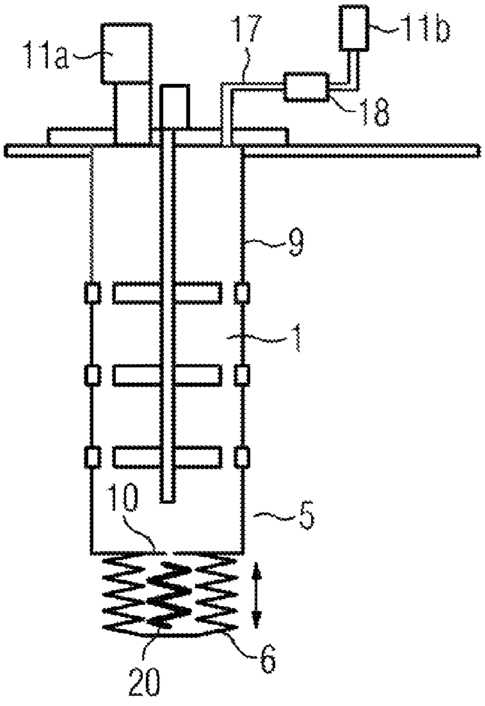
Figure 7D:
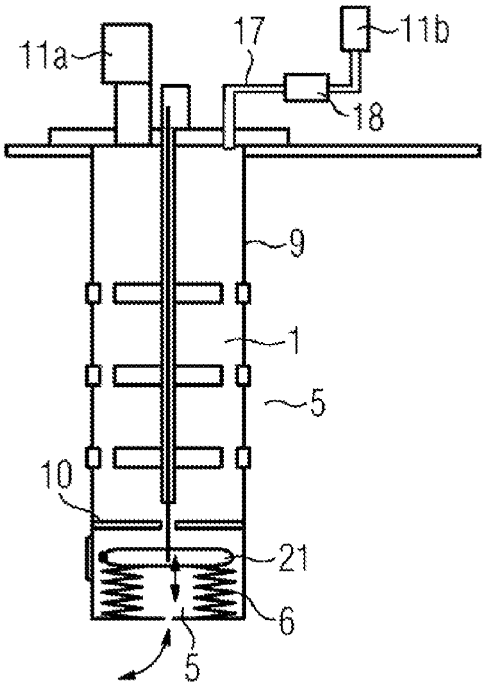

The figure FIG. 7*d* shows the compensation element 6 equipped with a spring element 20 in order to achieve a predetermined pressure difference between the two insulating liquids. This makes it possible to ensure, by way of example, protection against entry by the insulating and cooling medium 4 in the electrical component 1 in the event of a leak, said insulating and cooling medium being polluted as a result of switching processes.

The figure FIG. 7*c* shows an electrical component 1 in which the compensation element 6 contains a negative compensator and the specific setting of a pressure difference between the insulating and cooling medium 4 in the electrical component 1 and the liquid 5 in the housing 2 of the electrical installation 3 can be produced by means of an additional setting force acting on the compensation element 6. In the exemplary embodiment, this force is produced by the force due to weight of a loading body 21 and/or by a spring element. This loading body 21 may advantageously be in the form of an electrode.

Figure 8:
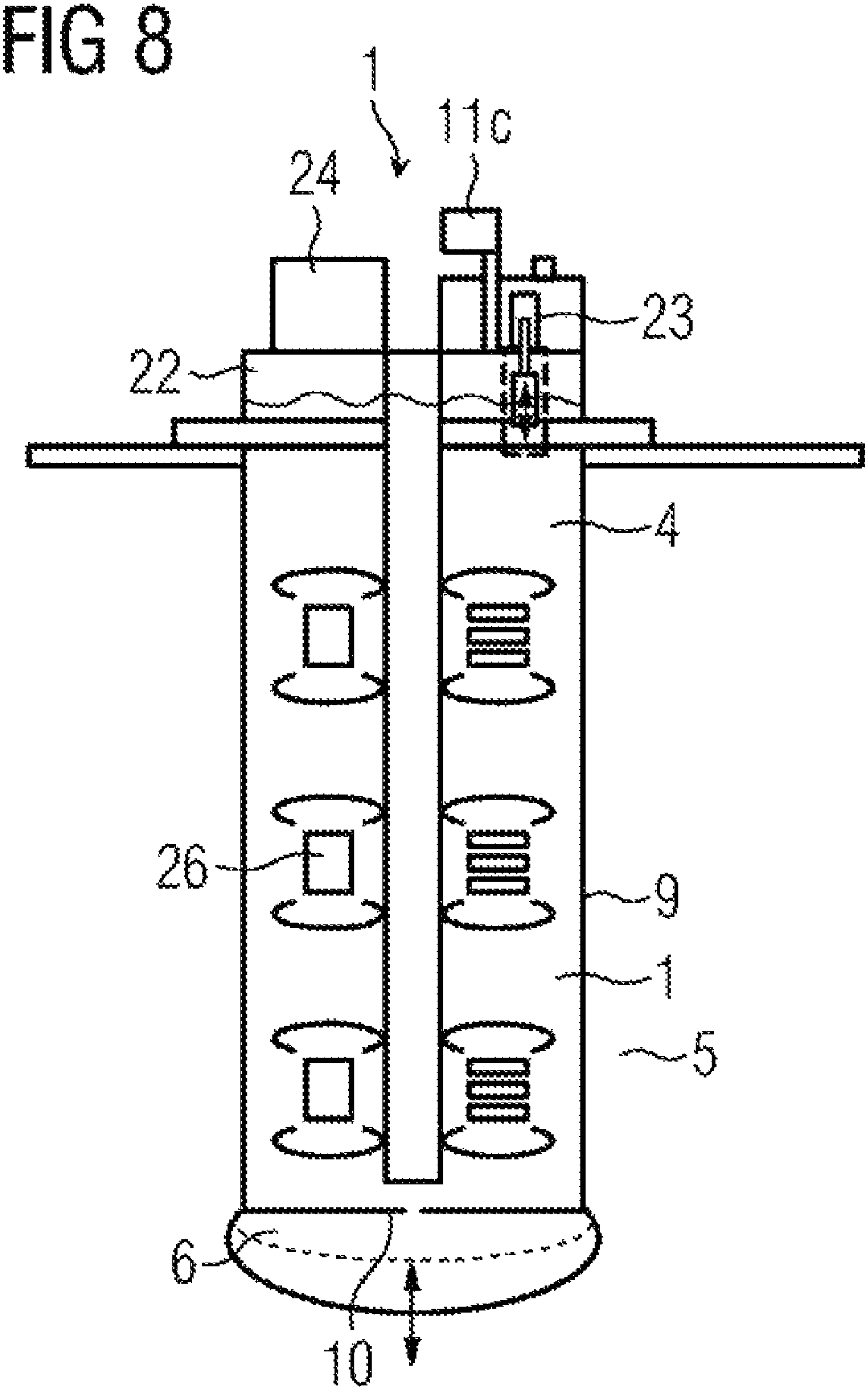
FIG. 8 shows a schematic side view of the electrical component with additional volume bodies.

The figure FIG. 8 shows an electrical component 1 which is provided with an additional volume body 22 in the upper region of the electrical component 1 for the purpose of holding a suitable quantity of additional insulating and cooling medium 4, in order to replace the loss of insulating and cooling medium 4 which occurs upon decomposition, for example as a result of the transition resistors heating up. The gas produced upon decomposition rises and collects in this additional space in the volume body 22. The much larger volume of gas results in an excess pressure in the electrical component 1. If the pressure in the electrical component 1 exceeds a predetermined limit value, the gas drain 11*c*, which is closed during normal operation, opens and produces pressure relief with the surrounding atmosphere. Advantageously, a controller 23 ensures that the gas drain 11*c* responds only when gas is present in the head region of the electrical component 1.

Protection from pressure waves is undertaken by the pressure relief valve 24. Continued flow of the insulating and cooling medium 4 from the upper part of the electrical component 1 and drainage of the gas produced mean that the electrical component 1 is largely maintenance-free with a small physical size, the insulating and cooling medium 4 is completely sealed from the atmosphere and no outer oil expansion tank is required. Furthermore, vacuum cells 26 are arranged in the electrical component 1.

The invention claimed is:

1. An electrical component assembly, comprising:

a housing filled with a liquid;

an electrical installation disposed in said housing;

an electrical component disposed in said housing along with said electrical installation and filled with an insulating and cooling medium, said electrical component having a housing wall tightly sealing said electrical component; and at least one compensation element disposed in said housing and connected to said electrical component, said compensation element compensating for volume changes in said insulating and cooling medium.

2. The electrical component assembly according to claim 1:

wherein said housing is a hermetically sealed housing; and further comprising at least one compensating apparatus connected to said housing for absorbing an excess pressure in said housing.

3. The electrical component assembly according to claim 1, wherein said compensation element is integrated in said electrical component.

4. The electrical component assembly according to claim 1, further comprising a conduit connecting said compensation element to said electrical component.

5. The electrical component assembly according to claim 4, wherein said conduit has an opening formed therein positioned in a lower region of said electrical component to prevent any gases present from entering said conduit.

6. The electrical component assembly according to claim 4, further comprising at least one valve selected from the group consisting of passage valves, shutoff valves and drain valves, said valve being integrated in said electrical component and opens or closes when set pressures are exceeded or undershot.

7. The electrical component assembly according to claim 1, wherein said compensation element is formed at least partly from an electrically conductive material and is used as a shield.

8. The electrical component assembly according to claim 1, wherein said compensation element is an elastic diaphragm.

9. The electrical component assembly according to claim 1, wherein said compensation element contains at least one of metal compensators and bellows.

10. The electrical component assembly according to claim 1, wherein said compensation element has a spring element for producing a predetermined pressure difference between said housing and said electrical component.

11. The electrical component assembly according to claim 1, further comprising at least one pressure wave attenuator for protecting said compensation element from pressure waves.

12. The electrical component assembly according to claim 11, further comprising a supply line connected to said compensation element, said pressure wave attenuator is disposed in said supply line to the compensation element and reduces a cross section.

13. The electrical component assembly according to claim 1, wherein said housing wall of said electrical component is used one of partly and completely as said compensation element.

14. The electrical component assembly according to claim 1, wherein said electrical component is an electrical switch and said electrical installation is a transformer.

15. A configuration, comprising:

a housing filled with a liquid;

an electrical installation disposed in said housing;

an electrical component disposed in said housing and filled with an insulating and cooling medium, said electrical component having a housing wall tightly sealing said electrical component, said electrical component further having at least one apparatus for collecting and draining gases which are produced; and at least one compensation element disposed in said housing and connected to said electrical component, said compensation element compensating for volume changes in said insulating and cooling medium.

16. The configuration according to claim 15, wherein said electrical installation is equipped with apparatuses for detecting at least one of a filling level of said liquid, a filling level of said insulating and cooling medium and pressures.

17. The configuration according to claim 15, wherein said electrical component has a supplementary body for holding a small quantity of an additional insulating and cooling medium to replace losses of the insulating and cooling medium which arises in an event of decomposition as a result of at least one of switching processes and heating of the transition resistors.

18. The configuration according to claim 15, wherein a deformation caused on said compensation element by a volume alteration is measured and is used for at least one of evaluating and indicating an amount of the insulating and cooling medium present.

* * * * *